US008788729B1

(12) United States Patent
Zheng et al.

(10) Patent No.: US 8,788,729 B1
(45) Date of Patent: Jul. 22, 2014

(54) METHOD AND APPARATUS FOR RESOLVING WRITE AND READ CONFLICTS BETWEEN MEMORY MODULES ACCESSING BLOCKS OF A MEMORY (71) Applicant: Marvell International Ltd., Hamilton (BM)

(72) Inventors: Hongming Zheng, Cupertino, CA (US); Gangadhar Gadepalli, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/896,869

(22) Filed: May 17, 2013

Related U.S. Application Data (62) Division of application No. 10/459,798, filed on Jun. 12, 2003, now Pat. No. 8,447,900.

(51) Int. Cl.
*G06F 3/00* (2006.01)
*H04L 12/56* (2006.01)

(52) U.S. Cl.
CPC ...................... *H04L 49/90* (2013.01)
USPC ........................................................ 710/52

(58) Field of Classification Search
None
See application file for complete search history.

(56) References Cited

U.S. PATENT DOCUMENTS

| 3,729,715 | A | * | 4/1973 | Buedel ........................... 711/167 |
| 4,433,389 | A | | 2/1984 | York et al. |
| 5,469,558 | A | | 11/1995 | Lieberman et al. |
| 5,519,701 | A | | 5/1996 | Colmant et al. |
| 5,673,396 | A | | 9/1997 | Smolansky et al. |
| 5,794,069 | A | | 8/1998 | Chisholm et al. |
| 5,797,043 | A | | 8/1998 | Lewis et al. |
| 6,065,070 | A | | 5/2000 | Johnson |
| 6,134,617 | A | | 10/2000 | Weber |
| 6,233,651 | B1 | | 5/2001 | O'Neill et al. |
| 6,269,413 | B1 | | 7/2001 | Sherlock |
| 6,279,052 | B1 | | 8/2001 | Upadrastra |
| 6,354,946 | B1 | | 3/2002 | Finn |
| 6,381,659 | B2 | | 4/2002 | Proch et al. |
| 6,792,528 | B1 | * | 9/2004 | Hou ................................. 380/57 |
| 6,909,737 | B1 | * | 6/2005 | Kockmann et al. ........... 375/133 |
| 7,310,706 | B1 | * | 12/2007 | Stribaek et al. ............... 711/128 |
| 2003/0026161 | A1 | * | 2/2003 | Yamaguchi et al. ..... 365/230.03 |
| 2003/0210735 | A1 | | 11/2003 | Ahn et al. |

* cited by examiner

*Primary Examiner* — Henry Tsai
*Assistant Examiner* — Aurangzeb Hassan (57) ABSTRACT

A system includes a memory that stores and outputs data in a first-in-first-out order. A sequence generator generates a sequence of first values, and randomly assigns the first values to blocks of the memory. A first memory module, based on the sequence of first values, accesses a first block of the memory. A conflict module, in response to a write or read conflict existing between the first and second memory modules due to the first memory module accessing the first block, resolves the write or read conflict. The conflict module resolves the write or read conflict by reading a value from the first block, and based on the value, either (i) causing the first memory module to write to a second block of the memory instead of the first block, or (ii) preventing the first memory module from reading from the first block.

22 Claims, 7 Drawing Sheets

METHOD AND APPARATUS FOR RESOLVING WRITE AND READ CONFLICTS BETWEEN MEMORY MODULES ACCESSING BLOCKS OF A MEMORY

The present disclosure is a divisional of U.S. patent application Ser. No. 10/459,798 (now U.S. Pat. No. 8,447,600) filed on Jun. 12, 2003. The entire disclosure of the application referenced above is incorporated herein by reference.

FIELD

The present disclosure relates to buffer systems, and more particularly to buffer systems for communications channels.

BACKGROUND

Buffers include memory that provides temporary data storage. Buffers are often used to store data that is transferred between two locations or devices. For example, a buffer may temporarily store data that is transferred between two communications devices that operate at different speeds. The buffer may be implemented using Static Random Access Memory (SRAM), which has low latency and is generally expensive. The buffer may be a First In, First Out (FIFO) buffer, which outputs data in the same order that the data is stored. FIFO buffers are commonly incorporated in network devices such as switches and routers.

High-speed communication lines are sometimes formed using multiple channels that operate at variable lower speeds. For example, an Optical Carrier (OC)192 line may carry 16 channels traffic. While the available total bandwidth is limited to OC192 rate, data traffic for each channel may change from zero to the whole OC192 rate.

Conventional FIFO buffers for multi-channel communications devices store data from each channel in a dedicated block of memory, or can be viewed as using memory block linearly or incrementally. For example, a 16-channel communications device with 20 KB of memory for each channel requires a total of 320 KB of memory. This approach is reliable when the dedicated blocks of memory are of a sufficient size to meet the bandwidth requirements of the corresponding channel. As the number of channels increases, the total required memory also increases. For example, a similar device with 256 channels requires a total of 5,120 KB of memory. The cost of the dedicated low latency memory for applications with a large number of channels is prohibitive. Since total throughput is still limited to OC192 rate, the system typically uses only a very small fraction of the overall memory at any given moment.

In an exemplary conventional FIFO buffer, 16 channels can be combined to form an OC192 line. Each FIFO has 20 Kbytes and the system has a total of 320 Kbytes. The memory is divided into 1 Kbyte blocks, which are numbered from 0 to 319. A first FIFO uses memory blocks 0 to 19, a second FIFO uses blocks 20 to 39, etc. Each FIFO uses its memory blocks linearly (incrementally) and in a known sequence. The known sequences that are used by the different FIFOs do not overlap.

In another approach, the memory is divided into smaller blocks having a fixed size. When a FIFO buffer requires memory for a channel, the FIFO buffer requests a block from a block manager, which monitors the use of memory blocks. Since memory is dynamically assigned to each channel, a FIFO buffer can store data for an increased number of channels. In other words, the ratio of total buffer memory size to the number of channels is reduced as compared to the dedicated memory approach. Since the memory blocks are assigned to a channel when needed, the data from a particular channel is not necessarily stored in sequential memory locations. Therefore, during read back, the FIFO buffer uses a block index table to determine the next memory block. This approach requires additional logic and hardware, which increases the cost of the buffer.

SUMMARY

A system is provided and includes a memory, a sequence generator, a first memory module, and a conflict module. The memory is configured to store and output data in a first-in-first-out order. The sequence generator is configured to (i) generate a sequence of first values, and (ii) randomly assign the first values to blocks of the memory. The first memory module is configured to, based on the sequence of first values, access a first block of the memory. The conflict module is configured to, in response to a write conflict or a read conflict existing between the first memory module and a second memory module due to the first memory module accessing the first block of memory, resolve the write conflict or the read conflict. The conflict module resolves the write conflict or the read conflict by reading a value from the first block of the memory and based on the value read from the first block of the memory, either (i) causing the first memory module to write to a second block of the memory instead of the first block of the memory, or (ii) preventing the first memory module from reading from the first block of the memory.

In other features, a method is provided and includes: generating a sequence of first values; randomly assigning the first values to blocks of a memory, wherein the memory is configured to store and output data in a first-in-first-out order; and based on the sequence of first values, accessing a first block of the memory by a first memory module. The method further includes, in response to a write conflict or a read conflict existing between the first memory module and a second memory module due to the first memory module accessing the first block of the memory, resolving the write conflict or the read conflict. The write conflict or the read conflict is resolved by reading a value from the first block of the memory, and based on the value read from the first block of the memory, either (i) causing the first memory module to write to a second block of the memory instead of the first block of the memory, or (ii) preventing the first memory module from reading from the first block of the memory.

A first in, first out (FIFO) buffer system includes memory with a plurality of memory blocks. A first FIFO control module generates a first random sequence and stores first data in the memory blocks according to the first random sequence. A second FIFO control module generates a second random sequence that is different than the first random sequence and stores second data in the memory blocks according to the second random sequence.

In other features, the first and second FIFO control modules are capable of storing data in all of the memory blocks. The first FIFO control module extracts the first data from the memory blocks according to the first random sequence. The second FIFO control module retrieves the second data from the memory blocks using the second random sequence.

In still other features, a check block module stores a potential write block identifier. A block verifier communicates with the check block module and the memory and determines availability of a memory block corresponding to the potential write block identifier. The block verifier determines whether the memory block corresponding to the potential write block identifier has one of a used status and a not used status and sends a status signal to the check block module.

In other features, the FIFO control module sets a current write block identifier equal to a next write block identifier and the next write block identifier equal to the potential write block identifier when the memory block corresponding to the potential write block identifier has the not used status. The FIFO control module outputs a FIFO number and a sequence count when writing to one of the memory blocks.

In still other features, the check block module stores a potential read block identifier. The block verifier determines whether a memory block corresponding to the potential read block identifier has a FIFO number that matches the first FIFO control module. The first FIFO control module sets a current read block identifier equal to a next read block identifier and the next read block identifier equal to the potential read block identifier when the match occurs. The first FIFO control module includes a read counter that compares a read block count to the sequence count stored in the memory block corresponding to the current read block.

In still other features, a FIFO access arbiter module communicates with the first and second FIFO control modules and the memory. The FIFO access arbiter module stores the first data and the second data to and extracts the first data and the second data from the plurality of memory blocks. The first FIFO control module generates the first random sequence based on a first Fibonacci sequence with a first tap value and a first initialization value.

The first FIFO control module receives the first data from a first communications channel and the second FIFO control module receives the second data from a second communications channel. The FIFO buffer system is implemented in one of a network switch and a network router.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description of the preferred embodiment(s) is merely exemplary and is in no way intended to be limiting. For purposes of clarity, the same reference numbers will be used in the drawings to identify similar elements.

Figure 1:
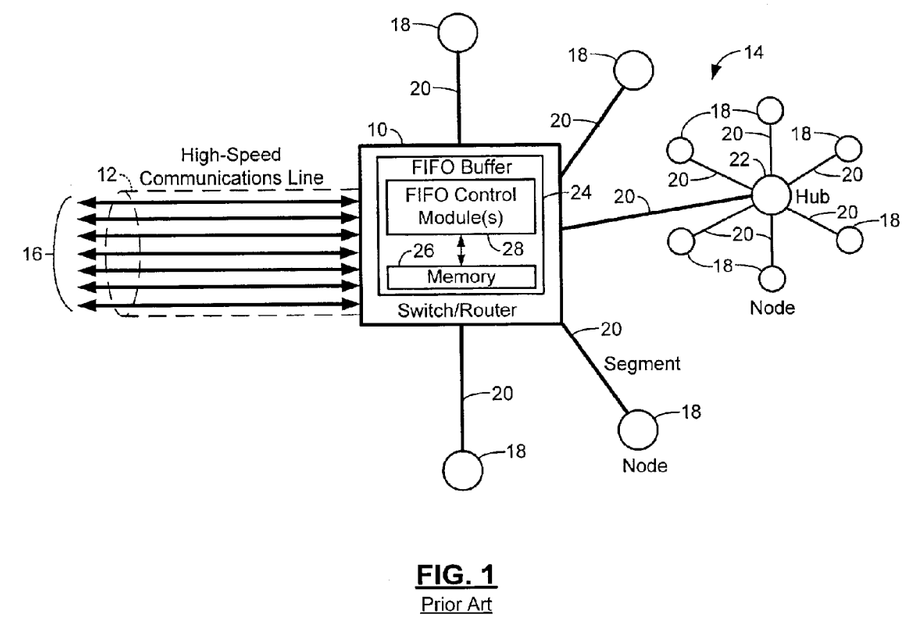
FIG. 1 is a functional block diagram of an exemplary network device that is connected to a high-speed communication line with multiple channels according to the prior art.

Referring to FIG. 1, a network device 10 is connected to a high-speed communications line 12 in an exemplary network 14. For example, the network device 10 may be a switch, a router, or any other network device. The high-speed communications line 12 may include multiple channels 16. For example, an Optical Carrier (OC)192 line that operates at 9.6 Gigabits per second (Gbps) may include 4 channels, 16 channels, or other aggregated channel combinations.

The network device 10 is connected to nodes 18 of the network 14 through network segments 20 and a hub 22. The nodes 18 may include computers, Wide Area Networks (WANs), and/or Local Area Networks (LANs). The network device 10 includes a FIFO buffer system 24, which includes FIFO control module(s) 28 and memory 26. While the FIFO buffer system 24 in FIG. 1 is incorporated into a network device, skilled artisans will appreciate that the buffers may be utilized in other data storage applications.

Incoming data such as data packets may be buffered for several reasons. For example, the multiple channels 16 of the high-speed communications line 12 and the network segments 20 that connect to the network device 10 may operate at different speeds. Alternately, buffer modules may be used in a variety of other ways including, but not limited to, error correction, packet alteration, packet processing, and/or other functions.

The FIFO buffer system 24 preferably has low latency and includes embedded Static Random Access Memory (SRAM), although other types of memory may be used. The FIFO control module(s) 28 may be implemented using combinatorial logic, dedicated circuits, a controller, an application specific integrated circuit (ASIC), software and a processor, or in any other suitable fashion.

Figure 2:
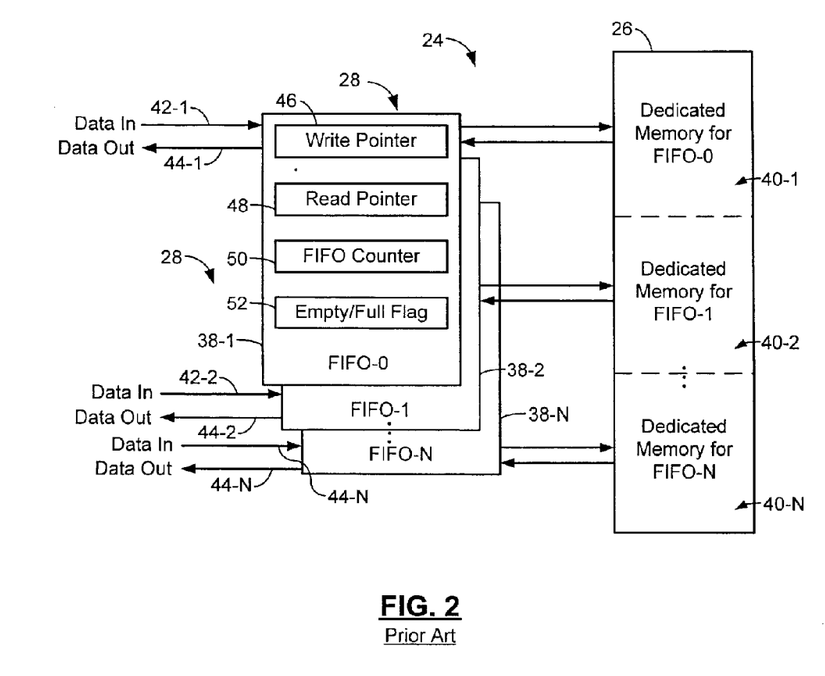
FIG. 2 is a functional block diagram of a FIFO buffer system that includes dedicated portions of memory for each channel according to the prior art.

Referring now to FIG. 2, a static FIFO buffer system according to the prior art is shown in more detail. FIFO buffer control modules 38-1, 38-2, . . . , and 38-N and corresponding memory blocks 40-1, 40-2, . . . , and 40-N buffer data from channels 1, 2, . . . , and N, respectively. The FIFO buffer control modules 38-1, 38-2, . . . , and 38-N are assigned to dedicated memory blocks 40-1, 40-2, . . . , and 40-N. For example, each of the FIFO buffer control modules 38-1, 38-2, . . . , and 38-N may be assigned 20 kilobytes (kB) of memory, which may be divided into blocks such as 1 KB as described above.

The FIFO buffer control modules 38-1, 38-2, . . . , and 38-N store incoming data 42-1, 42-2, . . . , and 42-N to the corresponding dedicated memory blocks 40-1, 40-2, . . . , and 40-N. The FIFO buffer control modules 38-1, 38-2, . . . , and 38-N also extract the data from their corresponding dedicated memory blocks 40-1, 40-2, . . . , and 40-N. The data is output by data outputs 44-1, 44-2, . . . , and 44-N.

The FIFO buffer control modules 38-1, 38-2, . . . , and 38-N may include a write pointer 46, a read pointer 48, a counter 50, and an empty/full flag 52. The write pointer 46 identifies the location where the FIFO buffer control module 38-1, 38-2, . . . , or 38-N is currently storing data. The read pointer 48 identifies the location where the FIFO buffer control module 38-1, 38-2, . . . , or 38-N is currently reading data. The counter 50 increments as the FIFO buffer control modules

38-1, 38-2, . . . , and 38-N store data in the corresponding memory block 40-1, 40-2, . . . , or 40-N. The counter 50 rolls-over when the write pointer 46 reaches the end of the memory block 40-1, 40-2, . . . , or 40-N.

The empty/full flag 52 indicates when the memory block 40-1, 40-2, . . . , or 40-N is empty. The empty/full flag 52 also indicates when the memory block 40-1, 40-2, . . . , or 40-N is full and cannot accept more incoming data. In the event the empty/full flag 52 indicates that the memory block 40-1, 40-2, . . . , or 40-N is full, the FIFO buffer control module 38-1, 38-2, . . . , and 38-N blocks incoming data until additional locations in the corresponding memory block 40-1, 40-2, . . . , or 40-N are available.

Figure 3:
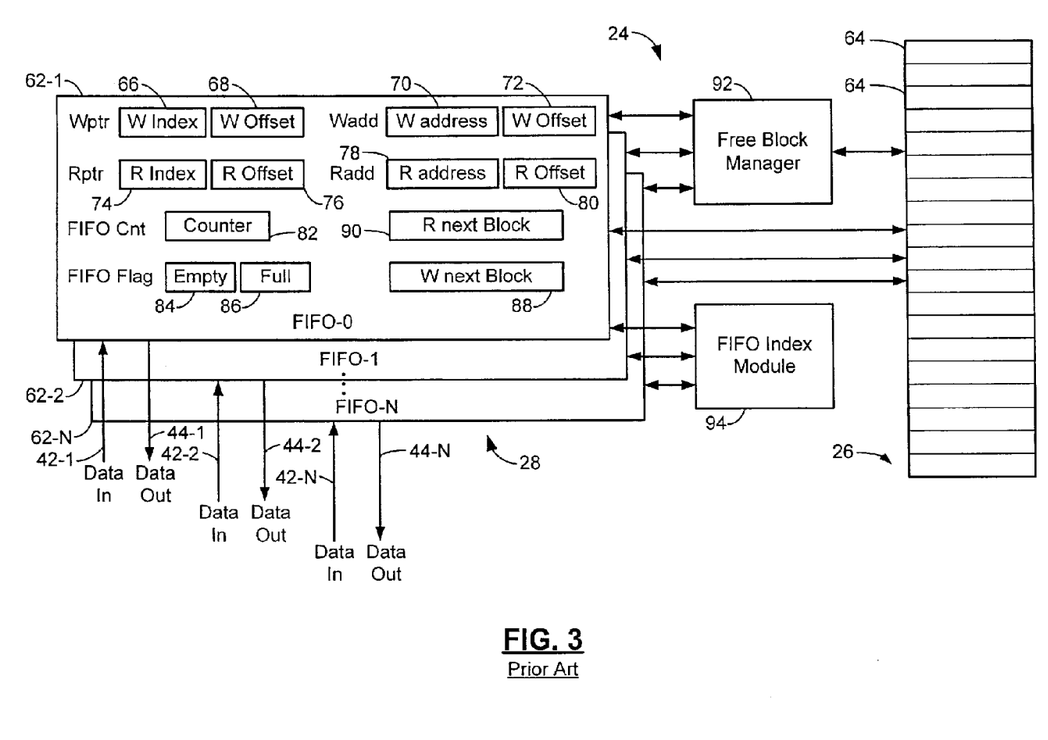
FIG. 3 is a functional block diagram of a FIFO buffer system that includes memory blocks that are assigned to channels according to the prior art.

Referring now to FIG. 3, a dynamic FIFO buffer system is shown. The entire memory is shared by FIFO buffer control modules 62-1, 62-2, . . . , and 62-N. The memory is divided into memory blocks 64 that are typically (but not necessarily) smaller than the memory blocks 40 of FIG. 2 (for a similar number of channels and total memory size). For example, a 256 KB memory divided into 1,024 memory blocks has a memory block size of 256 B.

The write pointer 46 includes a write index 66 and a write offset 68, which are mapped to a write address 70 and a write address offset 72. The write index 66 identifies the location in the memory 26 where a FIFO buffer control module 62-1, 62-2, . . . , or 62-N is currently storing data. The write index may include a block identification such as a block number. The write offset 68 increments as the FIFO buffer control module 62-1, 62-2, . . . , or 62-N writes data to one of the memory blocks 64. The write address 70 identifies the physical address of the write index 66. The write address offset 72 indicates the current offset from the write address 70 within one of the memory blocks 64 and may coincide with the write offset 68. Likewise, the read pointer 48 includes a read index 74 and a read offset 76 that function in a manner that is similar to the write index 66 and the write offset 68. The read index 74 and the read offset 76 are mapped to a read address 78 and a read address offset 80.

A counter 82 indicates the current number of memory blocks 64 that contain data for the corresponding FIFO buffer control module 62-1, 62-2, . . . , or 62-N. An empty flag 84 indicates when the memory block 64 being read by the FIFO buffer control module 62-1, 62-2, . . . , or 62-N is empty. A full flag 86 indicates when the memory block 64 being written by the FIFO buffer control modules 62-1, 62-2, . . . , or 62-N is full. A next write block module 88 contains an identification for the next memory block to be written by the FIFO buffer control module 62-1, 62-2, . . . , or 62-N. For example, the block identification may be a block number or physical address. A next read block module 90 contains an identification for the next memory block to be read by the FIFO buffer control module 62-1, 62-2, . . . , or 62-N.

A free block manager 92 communicates with the FIFO buffer control modules 62-1, 62-2, . . . , and 62-N. The free block manager 92 identifies empty memory blocks 64 for data storage by the FIFO buffer control modules 62-1, 62-2, . . . , and 62-N. When one of the FIFO buffer control modules 62-1, 62-2, . . . , or 62-N fills one of the memory blocks 64, the FIFO buffer control module 62-1, 62-2, . . . , or 62-N requests a free memory block from the free block manager 92. Therefore, additional memory blocks 64 are assigned to the FIFO buffer control modules 62-1, 62-2, . . . , and 62-N as needed.

A FIFO index module 94 communicates with the FIFO buffer control modules 62-1, 62-2, . . . , and 62-N. The FIFO index module 94 maintains a record of the memory blocks 64 that contain data from the FIFO buffer control modules 62-1, 62-2, . . . , and 62-N. When one of the FIFO buffer control modules 62-1, 62-2, . . . , or 62-N requests a free memory block from the free block manager 92, the block identification is also sent to the FIFO index module 94. The FIFO index module 94 also stores the order that the memory blocks 64 are written.

Memory blocks 64 are dynamically assigned to the FIFO buffer control modules 62-1, 62-2, . . . , and 62-N. Incoming data on the data input 42-1, 42-2, . . . , or 42-N is written to the location identified by the write pointer 46. The full flag 86 identifies when the current write block is full. The write pointer 46 moves to the location identified by the next write block module 88. The identification from the next write block module 88 is also sent to the FIFO index module 94 to indicate the next memory block in sequence where the FIFO buffer control module 62-1, 62-2, . . . , or 62-N extracts data. The next write block module 88 requests a free block from the free block manager 92. The free block manager 92 sends a block identification for a free memory block to the next write block module 88.

Data at the location identified by the read pointer 48 is extracted and output on the data output 44-1, 44-2, . . . , or 44-N. The empty flag 84 identifies when a current read block is empty. The read pointer 48 moves to the location identified by the next read block module 90. The free block manager 92 identifies the empty memory block so that it can be assigned to another FIFO buffer control module 62-1, 62-2, . . . , or 62-N that is requesting a free memory block. The next read block module 90 requests the identification of the next memory block in sequence written by its FIFO buffer control module 62-1, 62-2, . . . , or 62-N from the FIFO index module 94. The FIFO index module 94 then eliminates the block identification from its index for the particular FIFO buffer control module 62-1, 62-2, . . . , or 62-N.

The dynamic FIFO buffer system increases efficiency by assigning memory blocks 64 to the FIFO buffer control modules 62-1, 62-2, . . . , and 62-N based on the incoming traffic on the different channels. The dynamic FIFO buffer system allows the FIFO buffer control modules 62-1, 62-2, . . . , and 62-N to request additional memory blocks 64 when a current memory block becomes full. While all of the FIFO buffer control modules 62-1, 62-2, . . . , and 62-N share the memory, one of the FIFO buffer control modules 62-1, 62-2, . . . , and 62-3 can fill the memory if data traffic on other channels is nonexistent. This prevents empty portions of the memory from being underutilized while other sections are full. However, memory blocks 64 occupied by one of the FIFO buffer control modules 62-1, 62-2, . . . , and 62-N may be located throughout the memory. During read back, the FIFO buffer control modules 62-1, 62-2, . . . , and 62-N communicate with the FIFO index module 94 to determine the next memory block in sequence. The FIFO index module 94 requires additional logic, hardware and complexity, which adds cost and additional processing time.

Figure 4:
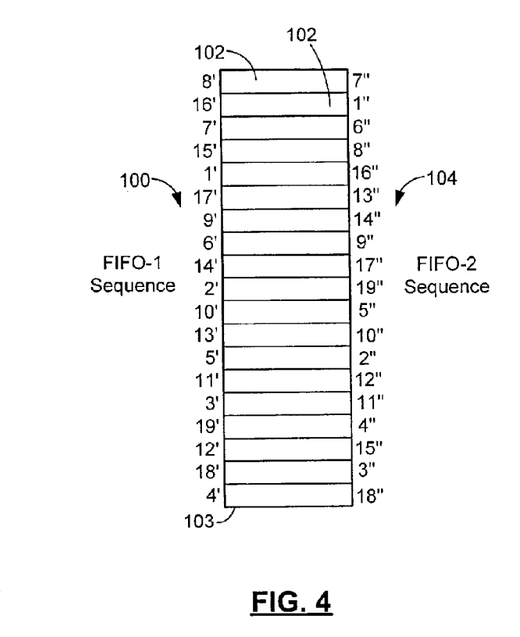
FIG. 4 illustrates multiple predetermined random sequences that are used to rearrange the memory blocks for each FIFO according to the present disclosure.

Referring now to FIG. 4, a FIFO buffer control system, according to the present disclosure uses random sequences to assign data to memory blocks 102 of memory 103. For example, the numbers 1'-19' are randomly assigned to the memory blocks 102. A second predetermined random sequence 104 that is different than the first random sequence is also used to store data to the memory blocks 103. Using the same example, the numbers 1"-19" are randomly assigned using a different random sequence. The first and second predetermined random sequences 100 and 104, respectively, are implemented by FIFO buffer control modules for different channels. The random sequences are preferably substantially orthogonal, which lowers the probability of overlap by different FIFO. The relative amount of orthogonality between the FIFO will depend upon the amount of memory that is shared, the average data traffic on the channels and other parameters.

The random sequences 100 and 104 provide a sequence or roadmap for the FIFO buffer control modules to follow when storing and extracting data. This eliminates the need for a FIFO index module to record the memory blocks 102 and/or the order of the memory blocks 102 that contain data stored by the FIFO buffer control modules. A separate predetermined random sequence is assigned to the memory blocks 102 for each channel. The number of memory blocks 102 determines the length of the sequences. For example, 1,024 memory blocks can be numbered 1-1,024. A memory assigned to a communication device with 256 channels includes 256 different predetermined random sequences of the memory blocks 102.

Figures 5A, 5B:
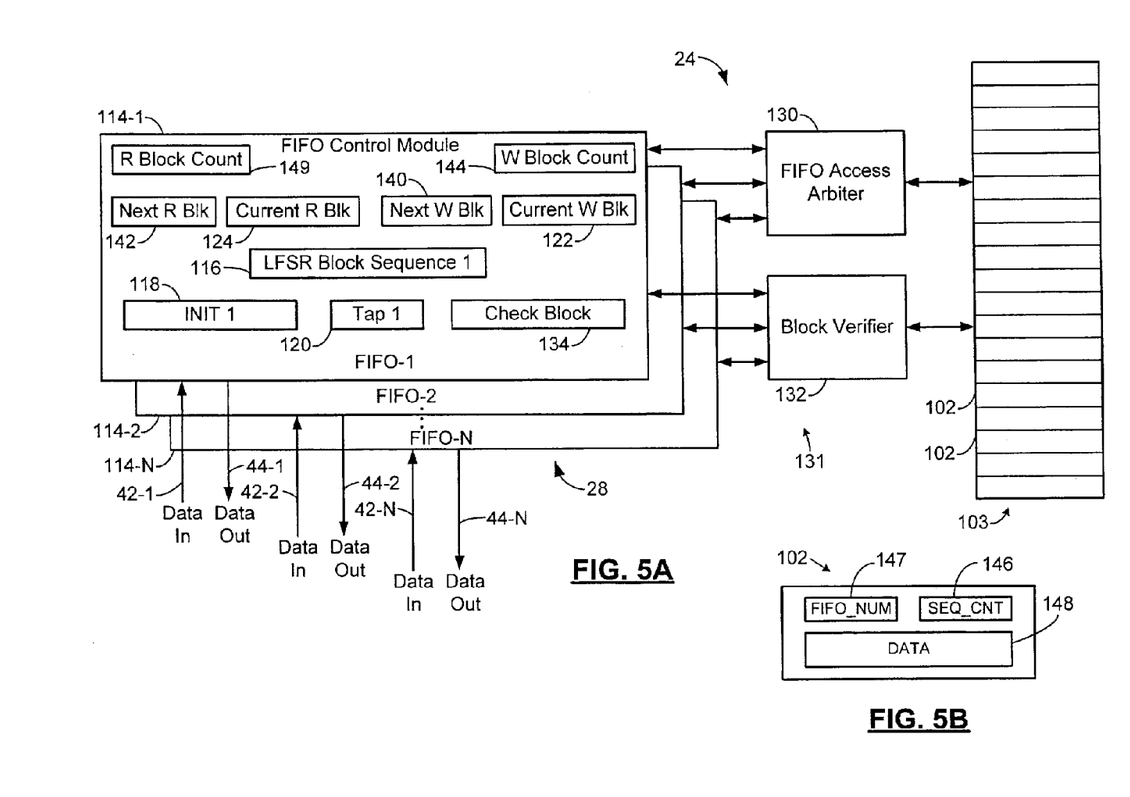
FIGS. 5A and 5B are functional block diagrams illustrating a FIFO buffer system that employs predetermined random sequences that are used to reorder memory blocks for each FIFO.

Referring now to FIGS. 5A and 5B, the FIFO buffer system that implements the predetermined random sequences is shown. The memory 103 is divided into a plurality of memory blocks 102 as in FIG. 4. FIFO buffer control modules 114-1, 114-2, ..., and 114-N store data from the data inputs 42-1, 42-2, ..., and 42-N in the memory blocks 102 based on the random sequences. Subsequently, the data is extracted from memory based on the random sequences and output on data outputs 44-1, 44-2, ..., and 44-N.

The FIFO buffer control modules 114-1, 114-2, ..., and 114-N each include a random sequence generator 116. The random sequence generator 116 can be a Fibonacci Linear Feedback Shift Register (LFSR). However, other random sequence generators and/or sequences may be used. For example, Gold, JPL, Barker, Walsh or other random sequence generators and/or sequences may be implemented. The random sequence generator 116 produces a random sequence with values that are used to assign the memory blocks 102.

For example, a sequence from the random sequence generator 116 contains 1,023 values for memory including 1,023 memory blocks. The sequence produced by each random sequence generator 116 is unique and repeatable. The numbers in the random sequences do not repeat until each number in the sequence occurs. Fibonacci sequences do not typically include the number zero. Since the first memory block in memory often includes an identification of zero, additional mapping logic can be used to ensure that the entire memory 26 is utilized or the first memory block can be skipped. Alternately, the first block can be combined with the second block to create one memory block having twice the length of the other blocks.

The random sequence provides a roadmap for a FIFO buffer control module 114-1, 114-2, ..., or 114-N to follow when storing or extracting data. The random sequence that is generated by the random sequence generator 116 is controlled by an initialization (init) module 118 and a tap module 120. The values stored in the init module 118 and the tap module 120 determine the random sequence that is produced by the random sequence generator 116. Each of the FIFO buffer control modules 114-1, 114-2, ..., and 114-N preferably have different values stored in the init module 118 and the tap module 120 to ensure that the random sequences are unique. The value in the init module 118 determines the initial value in the random sequence. The value in the tap module 120 determines the length of the random sequence.

A current write block 122 stores an identifier for a memory block to be written by the FIFO buffer control module 114-1, 114-2, ..., or 114-N. A current read block 124 stores an identifier for a memory block to be read by the FIFO buffer control module 114-1, 114-2, ..., or 114-N. A FIFO access arbiter module 130 communicates with the FIFO buffer control modules 114-1, 114-2, ..., and 114-N and stores data to memory and extracts data from memory.

As shown in FIG. 4, the memory blocks 102 are mapped by all of the FIFO buffer control modules 114-1, 114-2, ..., and 114-N. It is possible that one of the FIFO buffer control modules 114-1, 114-2, ..., and 114-N will attempt to access a memory block that is already occupied. Therefore, a block conflict module 131 resolves read and write conflicts between devices. The block conflict module 131 includes a block verifier 132 and a check block 134, which determine the availability of a requested memory block before one of the FIFO buffer control modules 114-1, 114-2, ..., and 114-N attempts to store data in or extract data from the requested memory block.

The check block 134 stores an identifier for a potential write memory block that is identified by the random sequence generator. When attempting to write data, the check block 134 communicates with the block verifier 132 to determine the availability of the potential write block. In a preferred embodiment, if the block is used, it will contain a FIFO_NUM 152 of another block. If empty, the block 102 will contain a FIFO_NUM of zero. Once the block verifier 132 determines that the memory block identified by the check block 134 is available, the block identifier is transmitted to a next write block 140.

When attempting to read data, the check block communicates with the block verifier to determine whether a potential read block from the random sequence generator has data from the corresponding FIFO. If it does, the FIFO_NUM will match the requesting FIFO that is attempting to read the block. If the block has the data from the corresponding FIFO, the memory block identifier is sent to the next read block 142. The SEQ_CNT is also checked.

When the memory block identified by the current write block 122 becomes full of data, the block identifier from the next write block 140 is transferred to the current write block 122. Data is written to the current memory block that is identified by the current write block 122 along with a write block count from a write block counter 144. The write block count is stored in SEQ_CNT 150. The FIFO identification for the corresponding FIFO is stored in FIFO_NUM 152. Data 154 is stored in the memory block. The FIFO_NUM 152 and SEQ_CNT 150 are used to cross check on read back. The FIFO control module, the check block 134 and the block verifier 132 repeat the process for subsequent blocks of write data. The FIFO access arbiter module 130 and the block verifier 132 may be round-robin arbiters, although other types of arbiters can be used. Priority can also be implemented for specified channels.

Figure 6A:
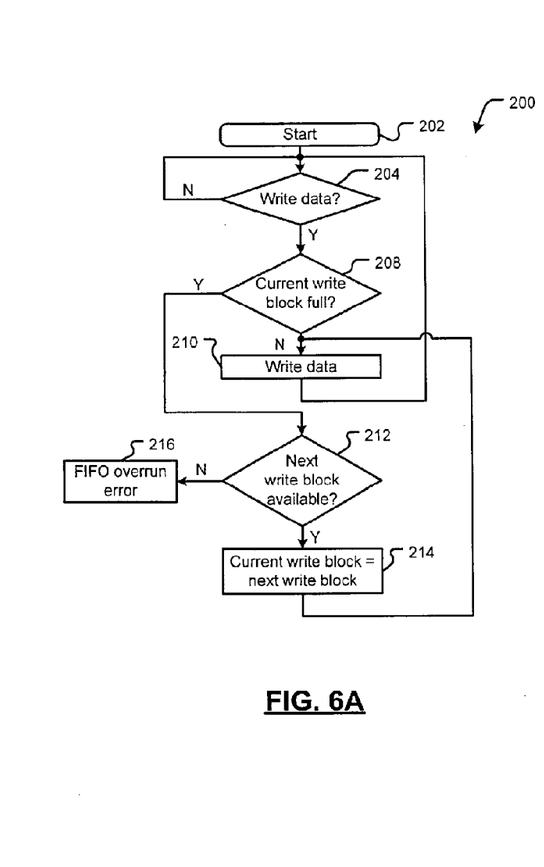
FIG. 6A illustrates steps for writing data.

Referring now to FIG. 6A, steps for writing data are shown generally at 200. Control begins in step 202. In step 204, control determines whether there is data to be written. If false, control loops back to step 204. If true, control continues with step 208 and determines whether the current write block is full. If false, data is written to the current write block in step 210 and control loops back to step 204. Otherwise, control determines whether the next write block is available in step 212. If write blocks are available, control sets the next write block equal to the current write block in step 214 and control returns to step 210. If no write blocks are available, control indicates a FIFO overrun error.

Figure 6B:
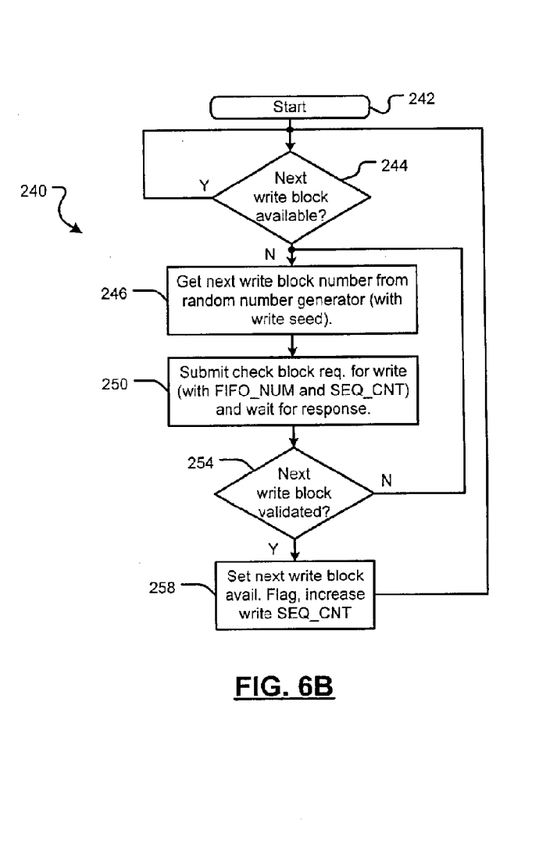
FIG. 6B illustrates steps for checking the availability of a next write block.

Referring now to FIG. 6B, steps for determining the availability of write blocks are shown generally at 240. Control begins with step 242. In step 244, control determines whether the next write block is available. If it is, control loops back to step 244. If not, control obtains the next write block number from the random number generator (with a write seed) in step 246. In step 250, control submits check block reference for write (with FIFO_NUM and SEQ_CNT) to the block verifier and waits for a response. In step 254, control determines whether the next write block is validated. If not, control loops back to step 246. If the next write block is validated, the block verifier and the check block write the FIFO_NUM and SEQ_CNT to the memory block, set the next write block available flag and increase the write sequence counter in step 258 and control returns to step 244.

Figure 7A:
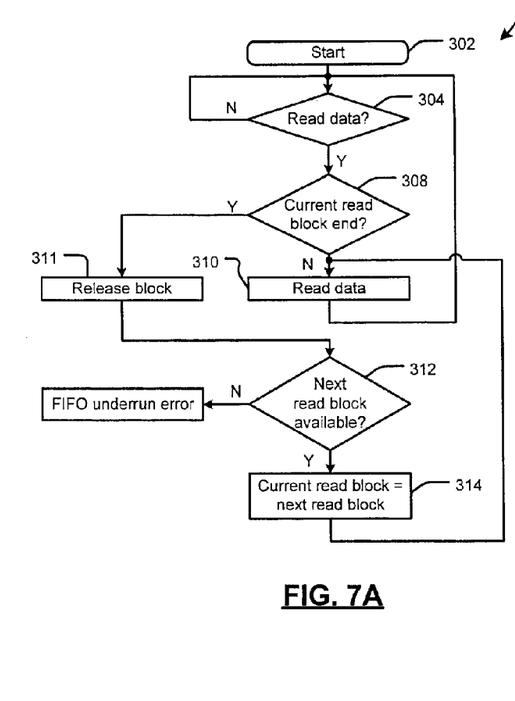
FIG. 7A illustrates steps for reading data.

Referring now to FIG. 7A, steps for reading data are shown generally at 300. Control begins in step 302. In step 304, control determines whether there is data to be read. If false, control loops back to step 304. If true, control continues with step 308 and determines whether the current read block is full. If false, data is read from the current read block in step 310 and control loops back to step 304. Otherwise, control releases the current read block in step 311 and determines whether the next read block is available in step 312. If read blocks are available, control sets the next read block equal to the current read block in step 314 and control returns to step 310. If no read blocks are available, control indicates a FIFO underrun error.

Figure 7B:
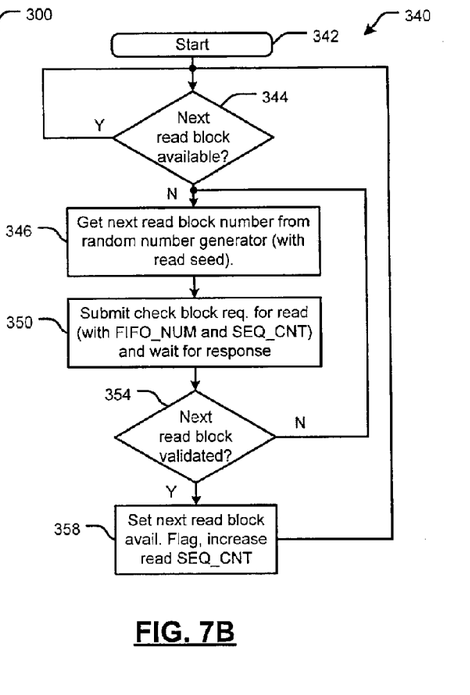
FIG. 7B illustrates steps for checking the availability of a next read block.

Referring now to FIG. 7B, steps for determining the availability of read blocks are shown generally at 340. Control begins with step 342. In step 344, control determines whether the next read block is available. If it is, control loops back to step 344. If not, control gets the next read block number from the random number generator with a read seed in step 346. In step 350, control submits check block reference for read (with FIFO. NUM and SEQ_CNT) and waits for a response. In step 354, control determines whether the next read block is validated. If not, control loops back to step 346. If the next read block is validated, control sets the next read block available flag and increase the read sequence counter in step 358 and control returns to step 344.

Those skilled in the art can now appreciate from the foregoing description that the broad teachings of the present disclosure can be implemented in a variety of forms. Therefore, while embodiments have been described in connection with particular examples thereof, the true scope of the embodiments should not be so limited since other modifications will become apparent to the skilled practitioner upon a study of the drawings, specification, and the following claims.

What is claimed is:

1. A system comprising:
a memory configured to store and output data in a first-in-first-out order;
a sequence generator configured to (i) generate a sequence of first values, and (ii) randomly assign the first values to blocks of the memory;
a first memory module configured to, based on the sequence of first values, access a first block of the memory; and
a conflict module configured to
based on the sequence of first values and prior to the first memory module writing to or reading from the first block of the memory, read a value from the first block of the memory,
based on the value read from the first block of the memory, determine whether a write conflict or a read conflict exists between the first memory module and a second memory module for the first block of the memory, and
in response to the write conflict or the read conflict existing between the first memory module and the second memory module, either resolve (i) the write conflict causing the first memory module to write to a second block of the memory instead of the first block of the memory, or (ii) the read conflict by preventing the first memory module from reading from the first block of the memory.

2. The system of claim 1, wherein:
the value read from the first block of the memory identifies the second memory module; and
the conflict module is configured to, based on the value read from the first block of the memory, cause the first memory module to write to the second block of the memory instead of the first block of the memory.

3. The system of claim 1, wherein the conflict module is configured to (i) determine whether the value read from the first block of the memory is a predetermined value, and (ii) based on whether the value read from the first block of the memory is the predetermined value, permit the first memory module to write to the first block of the memory.

4. The system of claim 1, wherein:
the conflict module is configured to, in response to the value identifying the first memory module, (i) permit the first memory module to read from the first block of the memory, and (ii) prevent the second memory module from reading from the first block of the memory; and
the conflict module is configured to, in response to the value identifying the second memory module, (i) permit the second memory module to read from the first block of the memory, and (ii) prevent the first memory module from reading from the first block of the memory.

5. The system of claim 1, further comprising the second memory module, wherein:
the sequence generator is configured to (i) generate a sequence of second values, and (ii) randomly assign the second values to the blocks of the memory; and
the second memory module is configured to access the first block of the memory based on the sequence of second values,
wherein the conflict module is configured to, based on the value read from the first block of the memory, permit the second memory module to one of write to or read from the first block of the memory.

6. The system of claim 5, wherein:
the first values include a same set of values as the second values; and
the sequence generator is configured to randomly assign the second values to the blocks of the memory in a different order than the first values.

7. The system of claim 1, further comprising:
a first access module configured to store a first block identifier;
a second access module configured to store a second block identifier; and
the second memory module (i) writes data to or reads data from the first block of the memory according to the first block identifier, and (ii) writes data to or reads data from a third block of the memory according to the second block identifier.

8. The system of claim 1, further comprising a verifier module configured to determine whether a block of the memory corresponding to a first block identifier is being used by the second memory module, wherein:
the sequence generator is configured to randomly generate the first block identifier; and
the conflict module is configured to, if the block of the memory corresponding to the first block identifier is not being used by the second memory module, permit the first memory module to access the block of the memory corresponding to the first block identifier.

9. The system of claim 8, wherein:
the sequence generator is configured to, if the block of the memory corresponding to the first block identifier is being used by the second memory module, randomly generate a second block identifier; and
the conflict module is configured to, if the block of the memory corresponding to the second block identifier is not being used by the second memory module, write in the block of the memory corresponding to the second block identifier (i) an identifier number of the first memory module, and (ii) a counter value of the sequence of the first values.

10. The system of claim 1, wherein:
the sequence generator is configured to generate the sequence of first values based on a Fibonacci sequence; and
the Fibonacci sequence is based on (i) a first identifier of an initial value of the sequence of first values, and (ii) a second identifier of a length of the sequence of first values.

11. A method comprising:
generating a sequence of first values;
randomly assigning the first values to blocks of a memory, wherein the memory is configured to store and output data in a first-in-first-out order;
based on the sequence of first values and prior to a first memory module writing to or reading from a first block of the memory, read a value from the first block of the memory via a conflict module, wherein the first memory module is configured to access the first block of the memory based on the sequence of first values;
based on the value read from the first block of the memory, determine whether a write conflict or a read conflict exists between the first memory module and a second memory module for the first block of the memory; and
in response to the write conflict or the read conflict existing between the first memory module and the second memory module, either resolving (i) the write conflict causing the first memory module to write to a second block of the memory instead of the first block of the memory, or (ii) the read conflict by preventing the first memory module from reading from the first block of the memory.

12. The method of claim 11, further comprising, based on the value read from the first block of the memory, causing the first memory module to write to the second block of the memory instead of the first block of the memory,
wherein the value read from the first block of the memory identifies the second memory module.

13. The method of claim 11, further comprising:
determining whether the value read from the first block of the memory is a predetermined value; and
based on whether the value read from the first block of the memory is the predetermined value, permitting the first memory module to write to the first block of the memory.

14. The method of claim 11, further comprising:
in response to the value identifying the first memory module, (i) permitting the first memory module to read from the first block of the memory, and (ii) preventing the second memory module from reading from the first block of the memory; and
in response to the value identifying the second memory module, (i) permitting the second memory module to read from the first block of the memory, and (ii) preventing the first memory module from reading from the first block of the memory.

15. The method of claim 11, further comprising:
generating a sequence of second values;
randomly assigning the second values to the blocks of the memory;
based on the sequence of second values, accessing the first block of the memory via the second memory module; and
based on the value read from the first block of the memory, permitting the second memory module to one of write to or read from the first block of the memory.

16. The method of claim 15, further comprising randomly assigning the second values to the blocks of the memory in a different order than the first values,
wherein the first values include a same set of values as the second values.

17. The method of claim 11, further comprising:
storing a first block identifier via a first access module;
storing a second block identifier via a second access module;
writing data to or reading data from the first block of the memory according to the first block identifier via the second memory module; and
writing data to or reading data from a third block of the memory according to the second block identifier via the second memory module.

18. The method of claim 11, further comprising:
randomly generating a first block identifier;
determining whether a block of the memory corresponding to the first block identifier is being used by the second memory module; and
if the block of the memory corresponding to the first block identifier is not being used by the second memory module, permitting the first memory module to access the block of the memory corresponding to the first block identifier.

19. The method of claim 18, further comprising:
if the block of the memory corresponding to the first block identifier is being used by the second memory module, randomly generating a second block identifier; and
if the block of the memory corresponding to the second block identifier is not being used by the second memory module, writing in the block of the memory corresponding to the second block identifier (i) an identifier number of the first memory module, and (ii) a counter value of the sequence of the first values.

20. The method of claim 11, further comprising generating the sequence of first values based on a Fibonacci sequence, wherein the Fibonacci sequence is based on (i) a first identifier of an initial value of the sequence of first values, and (ii) a second identifier of a length of the sequence of first values.

21. The system of claim 1, wherein the first memory module is configured to minimize conflicts between the first memory module and the second memory module by accessing (i) the first block of the memory based on the sequence of values, and (ii) the second block of the memory based on the sequence of values.

22. The system of claim 1, wherein:
if the value read from the first block of the memory is a predetermined value, the conflict module is configured to (i) determine no conflict exists between the first memory module and the second memory module, and (ii) permit the first memory module access to the first block of the memory; and if the value read from the first block of the memory is not the predetermined value, the conflict module is configured to (i) determine a conflict exists between the first memory module and the second memory module, and (ii) prevent the first memory module from accessing the first block of the memory.

\* \* \* \* \*